(12) United States Patent
Konoor et al.

(10) Patent No.: US 10,931,780 B2
(45) Date of Patent: Feb. 23, 2021

(54) RESOURCE PRE-CACHING AND TENANT WORKFLOW RECOGNITION USING CLOUD AUDIT RECORDS

(71) Applicant: INTERNATIONAL BUSINESS MACHINES CORPORATION, Armonk, NY (US)

(72) Inventors: Divya K. Konoor, Bangalore (IN); Muthu A. Muthiah, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 15/907,789

(22) Filed: Feb. 28, 2018

(65) Prior Publication Data
US 2019/0268435 A1    Aug. 29, 2019

(51) Int. Cl.
*G06F 15/16* (2006.01)
*H04L 29/08* (2006.01)

(52) U.S. Cl.
CPC .......... *H04L 67/2847* (2013.01); *H04L 67/10* (2013.01)

(58) Field of Classification Search
CPC ... H04L 67/2847; H04L 67/10; H04L 47/783; H04L 47/823; H04L 41/0806; H04L 12/4641; H04L 41/5019; G06F 9/45558
USPC .......................... 709/201, 220, 223–226, 250
See application file for complete search history.

(56) References Cited

U.S. PATENT DOCUMENTS

| | | | |
|---|---|---|---|
| 7,111,075 B2 * | 9/2006 | Pankovcin | G06F 16/258 709/246 |
| 7,676,508 B2 | 3/2010 | Robert | |
| 7,983,421 B2 * | 7/2011 | Chandrasekaran | H04L 9/0891 380/277 |
| 8,108,490 B2 | 1/2012 | Guo | |
| 8,850,261 B2 | 9/2014 | Blood et al. | |
| 10,347,286 B2 * | 7/2019 | Tammisalo | |
| 2003/0055809 A1 * | 3/2003 | Bhat | G06F 16/9014 |
| 2004/0006585 A1 * | 1/2004 | Paulus | G06Q 10/10 709/200 |
| 2005/0198401 A1 * | 9/2005 | Chron | H04L 12/413 709/250 |
| 2007/0192478 A1 * | 8/2007 | Louie | G06Q 10/06 709/224 |
| 2008/0082629 A1 | 4/2008 | Puthiyaveettil | |
| 2012/0179646 A1 | 7/2012 | Hinton et al. | |

(Continued)

OTHER PUBLICATIONS

"DMTF Releases Cloud Auditing Data Federation Standard." Mission Critical Magazine RSS, Mission Critical Magazine, Jun. 25, 2014, www.missioncriticalmagazine.com/articles/90285-dmtf-releases-cloud-auditing-data-federation-standard. (Year: 2014).*

(Continued)

*Primary Examiner* — Kaylee J Huang
(74) *Attorney, Agent, or Firm* — Dmitry Paskalov

(57) ABSTRACT

A method, computer system, and a computer program product for pre-caching resources within a cloud system is provided. The present invention may include enabling auditing. The present invention may also include following Cloud Auditing Data Federation standards. The present invention may then include determining one or more workflow patterns and resource utilizations. The present invention may then include predicting one or more resources. The present invention may lastly include caching the one or more predicted resources.

17 Claims, 6 Drawing Sheets

(56) References Cited

U.S. PATENT DOCUMENTS

| | | | |
|---|---|---|---|
| 2013/0144744 A1 | 6/2013 | Astete et al. | |
| 2014/0181130 A1* | 6/2014 | Davis | G06F 16/25 707/758 |
| 2014/0201289 A1* | 7/2014 | Wheeler | G06Q 10/107 709/206 |
| 2014/0222522 A1* | 8/2014 | Chait | G06Q 10/0637 705/7.36 |
| 2015/0106503 A1 | 4/2015 | Cama et al. | |
| 2016/0072911 A1* | 3/2016 | Velummylum | G06F 16/9574 709/224 |
| 2016/0110265 A1* | 4/2016 | Athani | G06F 16/22 707/654 |
| 2016/0301624 A1* | 10/2016 | Gonzalez | G06F 9/5083 |
| 2017/0308568 A1* | 10/2017 | Laethem | G06F 8/65 |

OTHER PUBLICATIONS

DMTF, "Cloud Auditing Data Federation," DMTF Standards, p. 1-2, Distributed Management Task Force, Inc., https://www.dmtf.org/standards/cadf, Accessed on Feb. 23, 2018.

Meera et al., "Event Correlation for Log Analysis in the Cloud," IEEE 6th International Conference on Advanced Computing, 2016, p. 158-162.

Mell et al., "The NIST Definition of Cloud Computing," National Institute of Standards and Technology, Sep. 2011, p. 1-3, Special Publication 800-145.

RAPID7, "How to Trace Transactions Across Every Layer of Your Distributed Software Stack," Rapid7 Blog, Sep. 22, 2014, p. 1-8, https://blog.rapid7.com/2014/09/22/how-to-trace-transactions-across-every-layer-of-your-distributed-software-stack/, Accessed on Feb. 23, 2018.

Verma et al., "Dynamic Resource Demand Prediction and Allocation in Multi-Tenant Service Clouds," Concurrency and Computation: Practice and Experience, 2016, 14 Pages, John Wiley & Sons, Ltd.

Wikipedia, "OpenStack," Wikipedia: the Free Encyclopedia, Last Edited on Feb. 16, 2018, p. 1-18, https://en.wikipedia.org/Wiki/OpenStack, Accessed on Feb. 23, 2018.

Disclosed Anonymously, "DMTF Releases Cloud Auditing Data Federation Standard", Mission Critical, Jun. 25, 2014, http://www.missioncriticalmagazine.com/articles/90285-dmtf-releases-cloud-auditiong-dat . . . , pp. 1-3.

* cited by examiner

RESOURCE PRE-CACHING AND TENANT WORKFLOW RECOGNITION USING CLOUD AUDIT RECORDS

BACKGROUND

The present invention relates generally to the field of computing, and more particularly to pre-caching resources in a cloud.

Many enterprises today leverage cloud technologies (including cloud-based services from a cloud provider) to optimize datacenter costs. A cloud provider may maintain a datacenter and may use cloud solutions from one or more vendors to manage the datacenter and provide services to customers.

SUMMARY

Embodiments of the present invention disclose a method, computer system, and a computer program product for pre-caching resources in a cloud. The present invention may include enabling auditing. The present invention may also include following Cloud Auditing Data Federation standards. The present invention may then include determining one or more workflow patterns and resource utilizations. The present invention may then include predicting one or more resources. The present invention may lastly include caching the one or more predicted resources.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
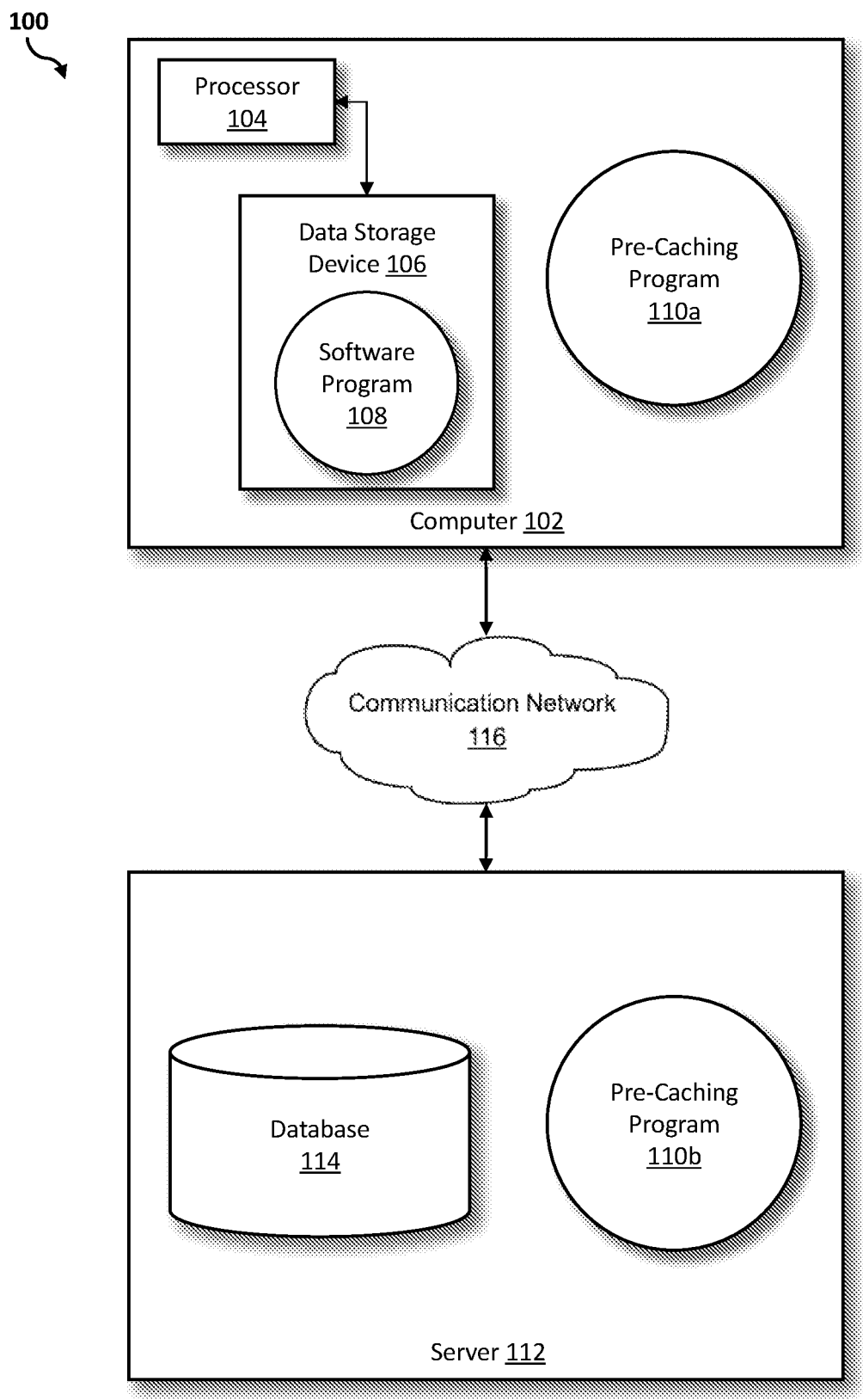
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for pre-caching resources in a cloud, based on user or tenant workflow. As such, the present embodiment has the capacity to improve the technical field of resource pre-caching by learning the workflow pattern of a user or tenant based on audit records generated from different cloud modules, such as compute, storage, and network, and pre-caching resources (e.g., software, storage, and virtual machines) within the cloud, based on the learned workflow pattern. More specifically, the pre-caching program may enable auditing for all modules, components, and services that comprise a cloud platform, ecosystem, or application. The pre-caching program may ensure that the audit records follow Cloud Auditing Data Federation Standards so that all required information for each operation is captured. The pre-caching program may direct or forward any live audit records to an analytical engine or tool to determine the workflow pattern and resource utilization. The pre-caching program may then predict resources utilizing an engine, module, or mechanism which monitors the determined workflow pattern and resource utilization over a period of time. The pre-caching program may then cache (load, manage, or prepare) resources in the cloud platform and may make the resources available upon a demand for same, thereby avoiding any time delay in needing to prepare the resources.

As described previously, many enterprises today leverage cloud technologies (including cloud-based services from a cloud provider) to optimize datacenter costs. A cloud provider may maintain a datacenter and may use cloud solutions from one or more vendors to manage the datacenter and provide services to customers. The demand for resources in a cloud-based environment may be highly dynamic. On certain days or months, the demand for a given resource may be high, while on other days or months, the demand for the same resource may be low. Based on the demand, resources in a cloud-based environment may be auto-scaled. However, in large datacenters, auto-scaling resources may not be done manually.

Therefore, it may be advantageous to, among other things, provide a mechanism to identify resource requirements in a cloud-based environment to cater to the demands of customers of a given cloud.

According to at least one embodiment, physical and/or virtual resources within a cloud ecosystem may be pre-cached in real-time, using resource utilization data and workflow patterns derived from audit data, log data, and notifications, all generated by the cloud platform. Resources may be unmanaged from the cloud platform based on derived workflow information.

According to at least one embodiment, audit data, log data, and notifications generated by the cloud platform may be used to identify, in real-time, the demands of the cloud system. This may help in caching (adding and making ready) resources in the cloud system, so that the system can proactively cater to the cloud's demands. This mechanism may help respond to the needs of the cloud customer faster, which in turn may lead to higher performance of the cloud system.

According to at least one embodiment, the pre-caching program may provide resource optimization within a datacenter by determining whether there is a need to deploy resources into the cloud system, based on derived resource utilization data and workflow patterns. This may assist in reducing total datacenter costs.

According to at least one embodiment, a cloud platform may manage physical and virtual resources, such as physical servers, storage providers, virtual servers, volumes, and network elements. Any standard cloud platform may be expected to generate audit data for any operation that is initiated on the cloud platform (for example, deployment of a virtual machine). Audit data may be more reliable than data generated via logs and general notifications since it is usually compliant with the Cloud Auditing Data Federation standards. The Cloud Auditing Data Federation may mandate that all information associated with a particular operation is captured as part of an audit record. Therefore, audit data may accurately identify activities occurring on a cloud platform. Software cloud platforms are often more distributed and comprised of multiple components or modules, which work together to handle multiple operations in parallel.

According to at least one embodiment, audit data may be utilized to arrive at the projected resource need of the infrastructure. This may be determined by leveraging publicly available analytical solutions and tools (e.g., ElasticStack®, among others) that can take in audit data from distributed modules that comprise the cloud system and correlate the data based on the timestamp, in order to arrive at the current usage of the cloud system.

According to at least one embodiment, a resource precaching and optimization engine may use the workflow pattern prediction to cache physical and virtual resources within a cloud infrastructure before a demand for same is made. Resource scaling may not wait for an initiation from the cloud administrator. Instead, resource scaling may precache and make available cloud resources so that the time taken to perform the sequence of operations is considerably reduced. Based on the workflow pattern and resource utilization data derived from the audit data, the resource precaching and optimization engine may load and prepare resources for use by the cloud system.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a pre-caching program 110a. The networked computer environment 100 may also include a server 112 that is enabled to run a pre-caching program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the pre-caching program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the pre-caching program 110a, 110b (respectively) to identify resource requirements in a cloud-based environment, to auto-scale resources in said environment, and to cater to the demands of customers of the given cloud. The pre-caching method is explained in more detail below with respect to FIGS. 2 and 3.

Figure 2:
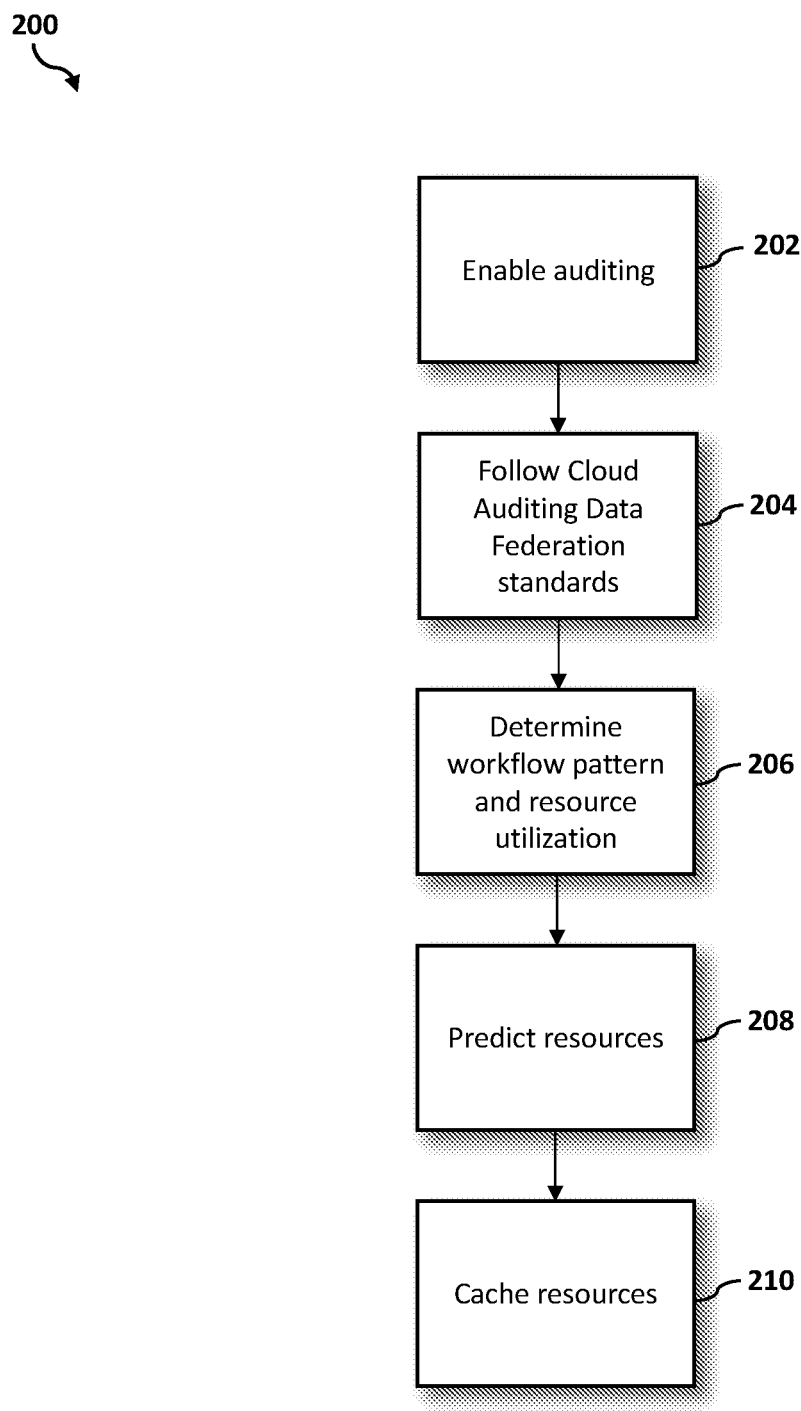
FIG. 2 is an operational flowchart illustrating a process for pre-caching resources in a cloud according to at least one embodiment.

Referring now to FIG. 2, an operational flowchart illustrating the exemplary pre-caching process 200 used by the pre-caching program 110a and 110b according to at least one embodiment is depicted.

At 202, auditing is enabled. A cloud platform may manage physical and virtual resources, such as physical servers, storage providers, virtual servers, volumes, and network elements. Any standard cloud platform may be expected to generate audit data for any operation initiated on the cloud platform (e.g., deployment of a virtual machine). Audit data may be generated by the cloud provider to keep track of all activities occurring within the cloud environment. This may be particularly significant in a public cloud or for government regulations, where the user may wish to closely monitor activities. Auditing may be required to be enabled when it is not enabled by default. Auditing may not be enabled by default when the process creates voluminous logs which take up a large portion of space on a host computer.

Audit data may be more authentic (i.e., reliable) than data generated via logs and general notifications when it is compliant with the Cloud Auditing Data Federation standards. The Cloud Auditing Data Federation may mandate that all information associated with an operation is captured as part of an audit record. Therefore, audit data which follows such standards may accurately identify activities occurring on a cloud platform. Software cloud platforms may often be more distributed and comprised of multiple components or modules which work together to handle multiple operations in parallel.

The pre-caching program 110a, 110b may gather and utilize audit records generated across all tenants for all modules and services constituting the cloud solution. This may include all subsystems of the cloud solution. Use of all audit records may result in a consolidated workflow pattern of all tenants serviced by the cloud provider. Audit data may be used from the current cloud provider software application as well as from past applications to accurately arrive at a consolidated workflow pattern of the current cloud infrastructure.

Cloud solutions may be implemented using a distributed architecture, often for better scale, redundancy, and high availability, with core management functionality running different services (including compute as a service and network as a service, among others) to help in managing the virtualized infrastructure. Audit data may be generated by each of these services, and may be a basic requirement of any cloud infrastructure. Auditing may keep track of all operations carried out by the cloud system, including operations performed on the cloud infrastructure using interfaces of the cloud solution (e.g., console, command line interface (CLI) or representational state transfer (REST) application programming interfaces (API)). Audit data may be generated when an operation is performed on the cloud infrastructure and may enable the lifecycle of each managed resource to be traced.

Audit data may be stored in individual logs (e.g., files, text files) or in databases (e.g., a collection of files as in database 114). It may be at the discretion of the software developer to determine a means by which to store records correlating to an application. A centralized collector within the pre-caching program 110a, 110b may have knowledge of the application's storage mechanism and may determine where the audit files are being stored. The pre-caching program 110a, 110b may then retrieve and analyze the audit files.

Based on the distributed architecture of a cloud platform, as described above, a cloud management solution may manage independent, albeit interdependent, components, with each component generating its own audit data specific to the resources managed by the respective component. As each component generates audit records for its own operation, the pre-caching program 110a, 110b may correlate the audit records generated for operations that occurred within different components into a single workflow. The correlation of these records may assist in deriving a meaningful sequence of events that has taken place within the entire cloud infrastructure. Further, recording workflow patterns may enable a cognitive system to understand the current resource usage of a customer, and to predict future usage. This may result in faster performance and more efficient resource management.

Audit data collected by the pre-caching program 110a, 110b may be sent to analytical engines (including QRadar, among others) for analysis.

At 204, the pre-caching program 110a, 110b ensures that the audit records follow Cloud Auditing Data Federation standards. Audit records generated in a cloud may comply with standards which mandate that specific information is recorded concerning the tenant, user, time, service, module, outcome, etc. Cloud Auditing Data Federation standards may ensure that audit records have more accurate and structured information to be leveraged (e.g., who the record relates to, what the record relates to, where the record is made, etc.). If the generated audit records follow Cloud Auditing Data Federation standards, then parsing the record and retrieving data may be easily accomplished by the pre-caching program 110a, 110b.

If a service does not follow Cloud Auditing Data Federation standards, then the pre-caching program 110a, 110b may parse the generated audit records to retrieve relevant information and re-compile the records in a standard-compliant format.

At 206, workflow patterns and resource utilizations are determined. Audit data, as described previously at 202, may be utilized here to determine the projected resource need of the infrastructure. Audit data in standard-compliant format, as described previously at 202 and 204, may be merged for each tenant (e.g., a user who initiates an action). Audit data for each operation occurring on all services within the cloud environment (e.g., operations occurring on distributed but correlated components of the cloud environment) may be merged. Audit records may be chronologically ordered based on an embedded timestamp. Operations occurring on all services of the distributed cloud environment may also be merged based on the embedded timestamp. The result may be a complete aggregated workflow, which may be used to analyze tenant use and derive patterns of tenant behavior from the tenant use.

For example, audit logs of a tenant may be analyzed and a sequence of actions and subsequent events may be derived. The pre-caching program 110a, 110b may search for the sequence of events within a specified timeframe in the set of merged audit records. Each sequence may receive a numerical ranking by the pre-caching program 110a, 110b, which may be a higher number based on the number of times the sequence occurs. A higher rank may indicate that the sequence occurs more frequently, or in other words, that the workflow is common and should be pre-cached by the pre-caching program 110a, 110b. A lower rank may indicate that the sequence occurs infrequently and that the pre-caching program 110a, 110b may not be optimizing use of the cloud environment by pre-caching resources used in the low-ranking sequence.

When a tenant action occurs in the cloud environment, the single action may span across multiple cloud modules. Tenant records spanning across different modules may be merged or aggregated by tracing the action from one module to the next. When a tenant performs an action (e.g., submits a request), the tenant's action may be assigned a request ID, which may become an integral part of every sub-action or sub-transaction performed in connection with the tenant's request. All workflows of a tenant may be merged here (i.e., tenant actions which span across multiple modules of the cloud environment may be correlated) and patterns may be drawn out, including repeated actions of the tenant, to optimize the tenant's use of the cloud solution.

Determining the projected resource need may further include leveraging publicly available analytical solutions and tools (e.g., Elastic Stack, among others) to analyze gathered data, to predict resource utilization, and to optimize cloud usage. The workflow pattern recognition engine may utilize this described pattern recognition mechanism to predict tenant workflow patterns based on audit records generated from previous operations.

For example, suppose a retail website is hosted on a cloud platform and the number of users shopping on a weekend is greater than the number of users shopping on a weekday. This information may help predict the need for a higher number of cloud resources needed on a weekend, as compared to a weekday, prior to any demand for same being made. Pre-caching of available resources may be done based on this resource prediction.

At 208, resources are predicted. A workflow pattern prediction mechanism may be used to automatically optimize resources in a cloud infrastructure. The pre-caching program 110a, 110b may use the workflow pattern prediction mechanism to resize, upscale, or downscale resources (e.g., add new hosts or storage space) at a predetermined time of day, based on the determined workflow pattern and resource utilization, as described previously at 206. Resizing resources may alter the size of existing resources with the number of resources remaining the same. Upscaling resources may increase the number of resources, while downscaling resources may decrease the number of resources. Utilizing audit data, it may be possible to identify the actual usage of resources and predict whether more resources may be required. For example, audit data from a current environment utilizing virtual resources of size L may be analyzed, and it may be predicted that within a certain amount of time, the environment will need to resize the existing resources to size XL, requiring N number of hardware components. Resources may be pre-cached and may be made available so that the time taken to perform a sequence of operations is considerably reduced.

For example, based on the resource utilization described previously at 206, the pre-caching program 110a, 110b may determine which resources of the cloud environment should be pre-allocated (i.e., pre-cached) so that they are readily available at the time of the tenant's request. By doing this, the pre-caching program 110a, 110b may reduce the amount of time to complete the entire workflow because the resources needed for the tenant's request will no longer be provisioned at the time the request is made.

Likewise, any resources that have not been used for a long time may be freed up (e.g., de-provisioned, released, unmanaged) by the pre-caching program 110a, 110b, so that only essential resources may be pre-cached prior to the tenant's demand. This may result in an optimized cloud solution and a cost-savings benefit.

Lastly, at 210, resources in the cloud solution are cached. A resource pre-caching and optimization engine may use the workflow pattern prediction, as described previously at 206 and 208, to cache physical and virtual resources within a cloud infrastructure before a demand for same is made.

As described previously at 202, the pre-caching program 110a, 110b may receive audit records as input, which may include real-time information of the operations occurring within the cloud environment. Using the received audit records, the pre-caching program 110a, 110b may calculate categories of primary, secondary, tertiary, etc. resources, across all tenants of a cloud environment. For example, when an online user orders a toy on Amazon, the toy is the primary resource and the cardboard box that is needed to ship the toy is the secondary resource. The cardboard box may, in turn, require a tertiary resource (e.g., tape). The result may be a tree-like structure of required resources based on the initial request (e.g., the purchase of a toy). A tree-like structure may be generated for each category of resource within the cloud environment. The pre-caching program 110a, 110b may track the rate of virtual resource creation (e.g., node creation) to predict the number of resources required at a given time in the future. For example, based on the tracked resources, it may be determined that within a given number of days, there will be a request for the creation of 10,000 virtual machines of size X on the cloud environment, and a deletion of 2,000 virtual machines of size X. The number of virtual machines of size X requested two days later will be an additional 4,000, at which time the number of virtual machines of size X will be 12,000 (10,000−2,000+4,000), which will need to be supported by sufficient hardware resources. If, for example, 12,000 virtual machines of size X require 10 hardware resources, and the cloud environment currently has 6 available, the pre-caching program 110a, 110b would make 4 additional resources cloud-ready so that at the time the resources are requested, they are available for use. This calculation may be made by the pre-caching program 110a, 110b for each category of resource within the cloud environment.

As described previously at 208, the engine may also have the intelligence to scale-down (e.g., unmanage) resources based on this workflow pattern, to help reduce infrastructure cost.

Pre-caching may be done for both hardware and software resources based on consolidated (e.g., merged) requirements of the entire cloud which may be derived from the patterns generated by analysis of tenant audit records and workflows, as described previously at 206. Further, pre-caching may be done for primary resources as well as secondary resources, based on the resource utilization derived from tenant audit records. For example, provisioning a virtual machine may include provisioning volumes (i.e., virtual disk space).

Pre-caching may be done with suggestions or choices. For example, the pre-caching program 110a, 110b may pre-cache virtual machines with different configurations and may provide suggestions to the tenant user on what might be the right resource to provision. A resource suggestion may be based on configurations which include actual usage of the tenant user.

Pre-caching may include automatic resizing of resources, which may also be based on actual usage by the cloud tenant. For example, a tenant may be provisioning a resource with a configuration which is larger or smaller than what was originally requested. In this instance, the portion of the resource used by the tenant may be pre-cached by the pre-caching program 110a, 110b.

Figure 3:
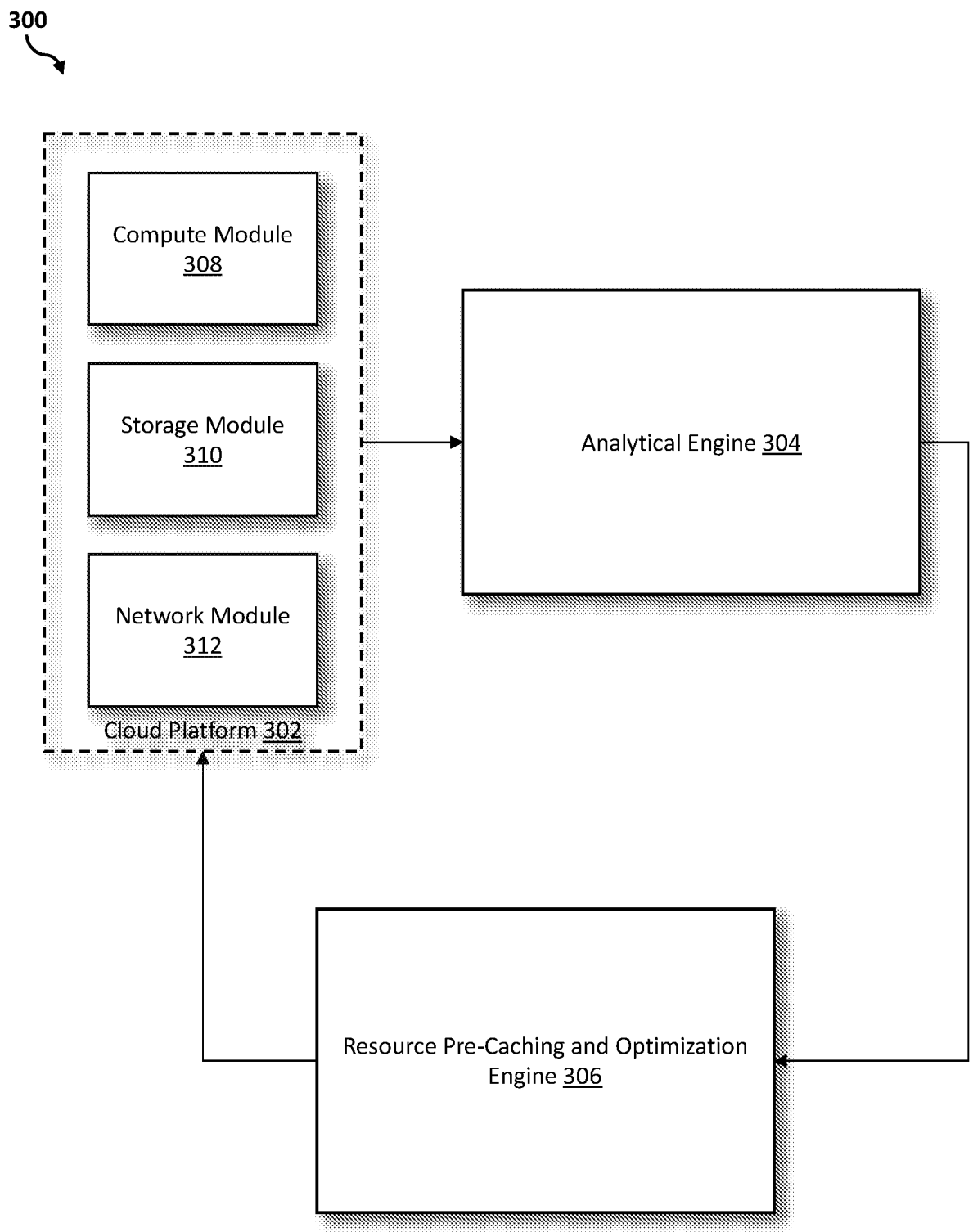
FIG. 3 is a block diagram depicting components of the pre-caching program according to at least one embodiment.

Referring now to FIG. 3, a block diagram 300 of components of the pre-caching program 110a, 110b according to at least one embodiment is depicted.

A cloud platform 302 may be comprised of different modules, including a compute module 308, a storage module 310, and a network module 312. Audit records, as described previously at 202, may be generated from the modules of the cloud platform. Generated audit records may be analyzed by the analytical engine 304 to determine resource utilization and workflow patterns from the audit data. The resource pre-caching and optimization engine 306 may predict workflow and future resource utilization needs, as described previously at 208. Resources may be auto up-scaled or down-scaled into the cloud platform in real-time, resulting in higher performance and faster responses by the cloud system.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
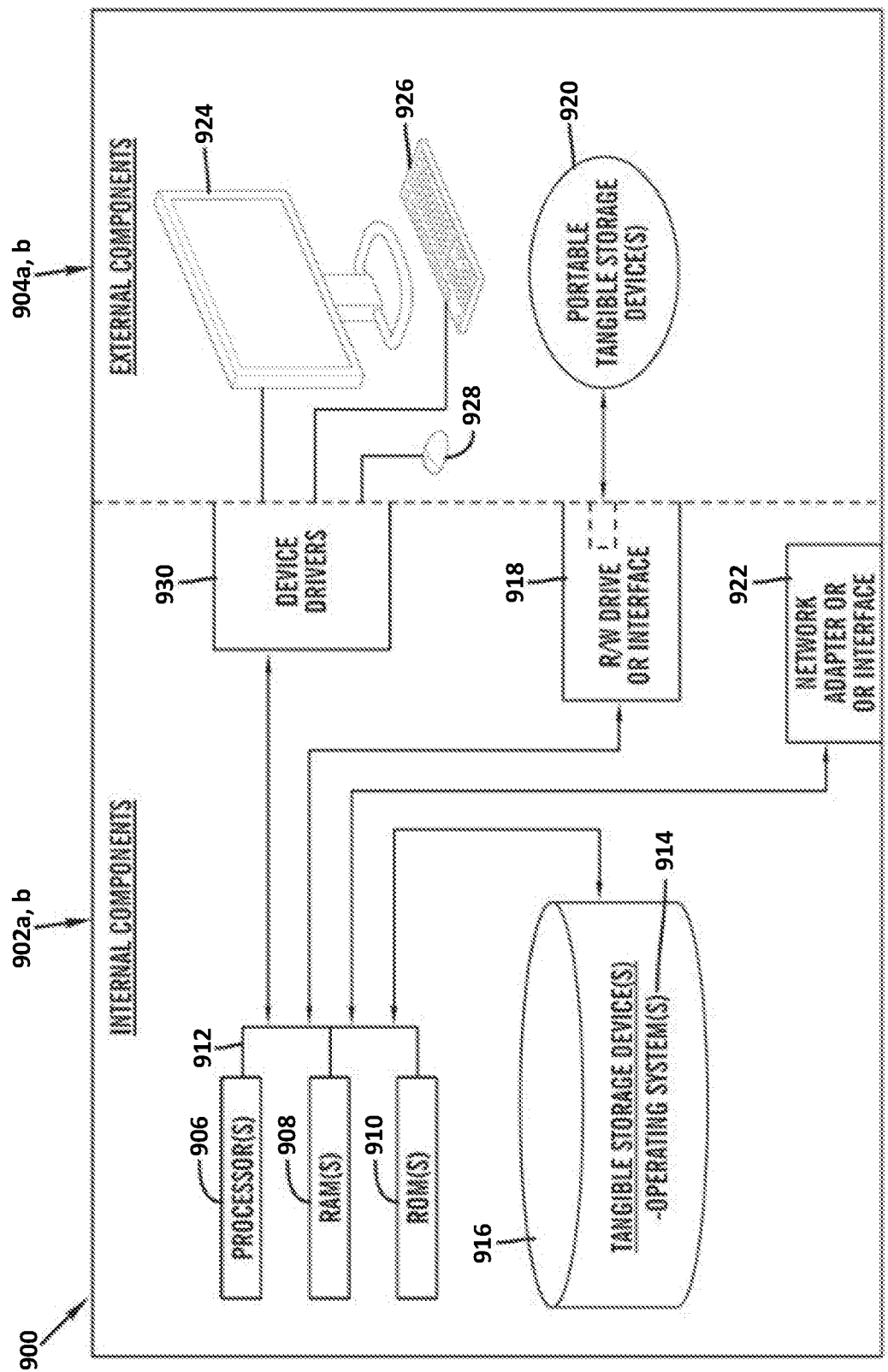
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the pre-caching program 110a in client computer 102, and the pre-caching program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the pre-caching program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the pre-caching program 110a in client computer 102 and the pre-caching program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the pre-caching program 110a in client computer 102 and the pre-caching program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
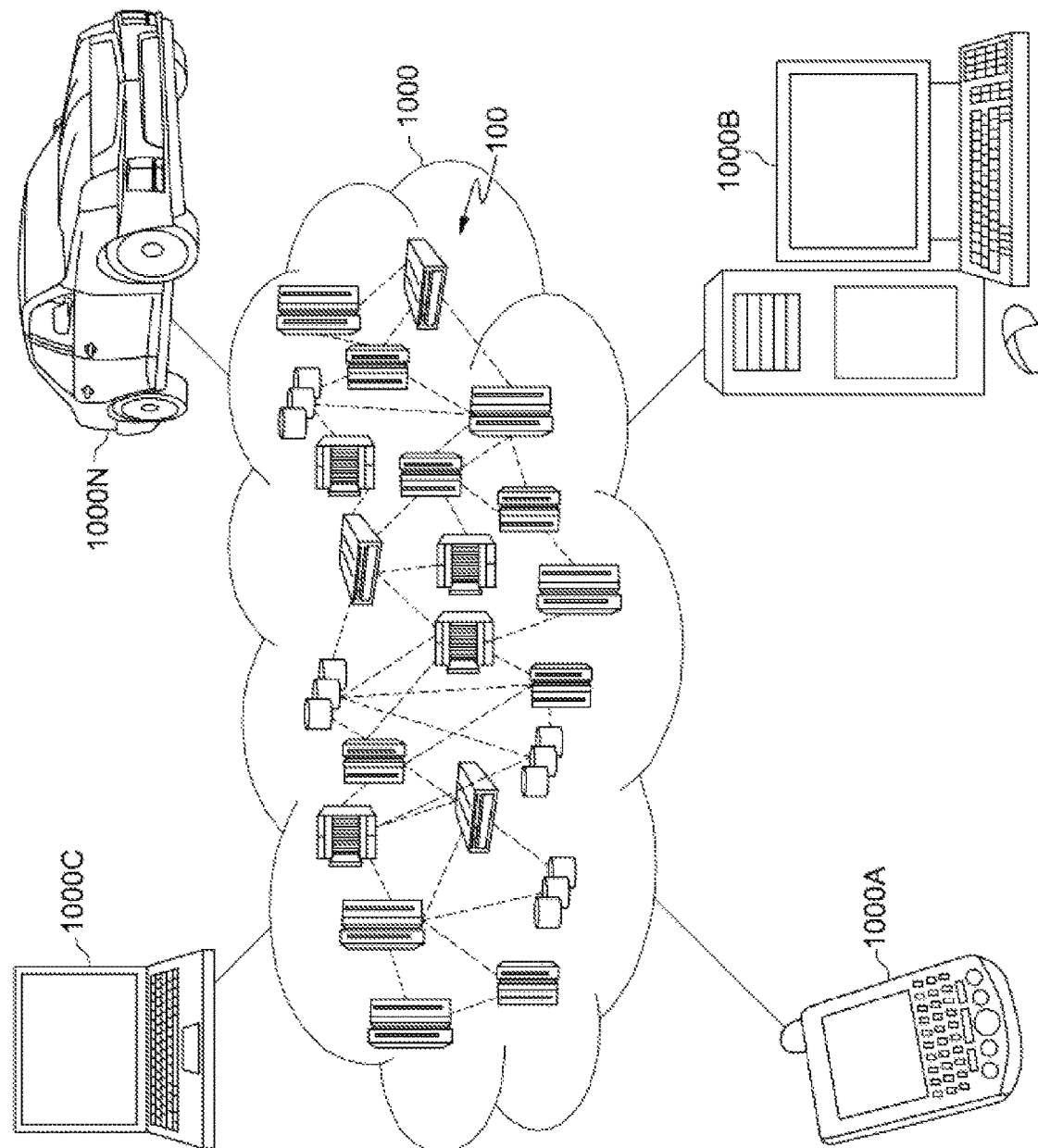
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
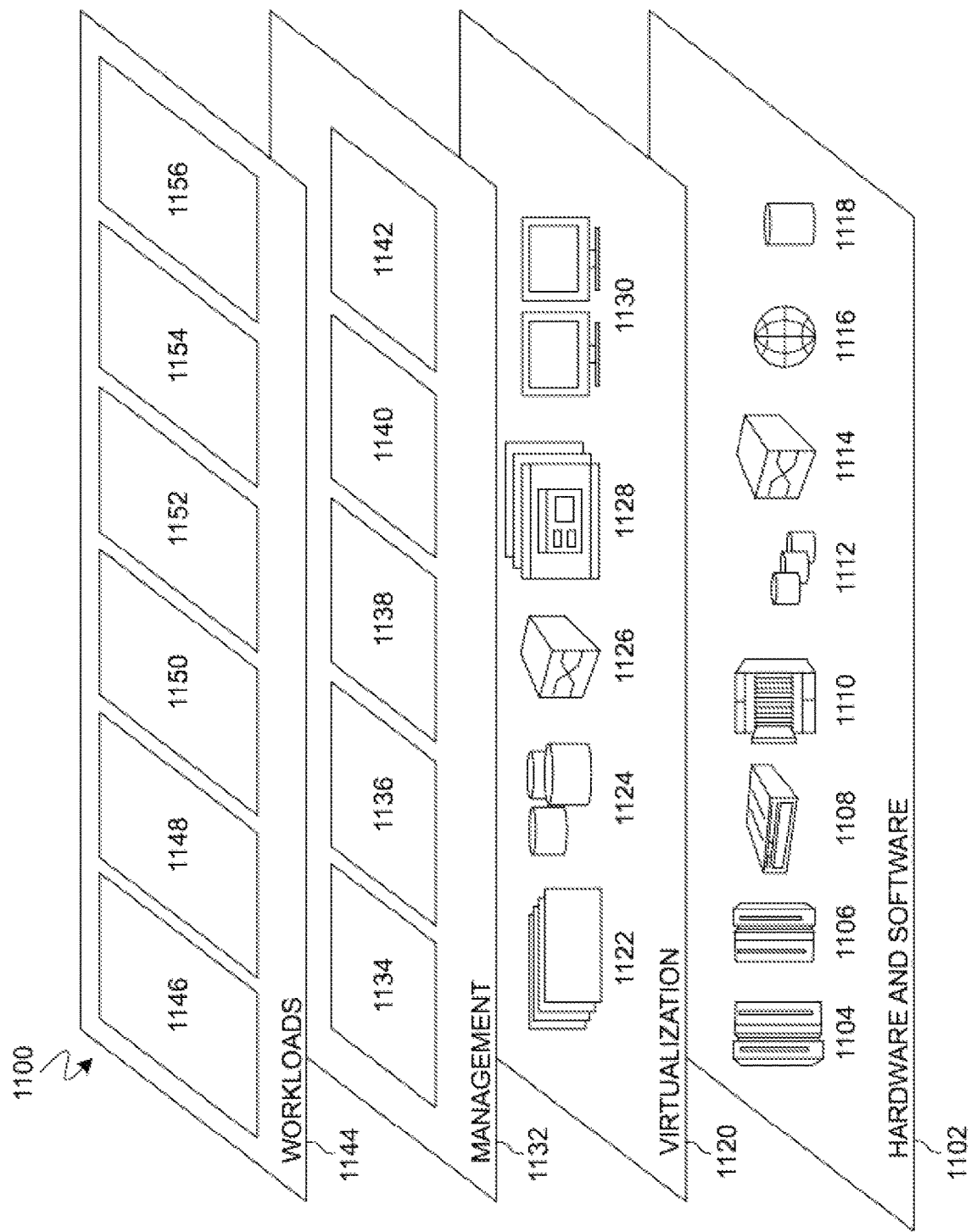
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and pre-caching 1156. A pre-caching program 110a, 110b provides a way to optimize resources used by a cloud solution.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for pre-caching resources within a cloud system, the method comprising:
    collecting audit records, wherein the audit records follow a data standard and used to identify, in real-time, demands of the cloud system, and wherein each of the audit records has an embedded timestamp;
    determining the collected audit records follow the data standard, wherein determining the collected audit records follow the data standard further comprises:
    parsing a generated audit record;
    retrieving data standard compliant information from the parsed generated audit records; and recompiling the parsed generated audit record in data standard compliant format;
determining one or more workflow patterns and resource utilizations based on the collected audit records, wherein the one or more workflow patterns and resource utilizations comprise a request, a request identification number, and the embedded timestamp;
determining a sequence of events during a timeframe based on analyzing the collected audit records, wherein the sequence of events has a numerical ranking that represents a number of times the sequence of events occurred in the collected audit records;
predicting one or more resources based on the determined one or more workflow patterns and resource utilizations, the sequence of events during the timeframe and the numerical ranking; and
caching, in the real-time, the predicted one or more resources to make the predicted one or more resources available at a time of a predicted request.

2. The method of claim 1, wherein collecting the audit records further comprises:
turning on auditing capabilities on an application of the cloud system; and
storing each of the audit records generated by the application of the cloud system in a text file.

3. The method of claim 2, wherein the audit records generated by the application of the cloud system are stored in an audit database maintained by the cloud system.

4. The method of claim 1, wherein determining the one or more workflow patterns and resource utilizations further comprises chronologically merging the audit records generated by an application of the cloud system based on the embedded timestamp and the request identification number.

5. The method of claim 1, wherein predicting the one or more resources based on the determined one or more workflow patterns and resource utilizations, the sequence of events during the timeframe and the numerical ranking further comprises upscaling or downscaling the resources based on the determined one or more workflow patterns and resource utilizations.

6. The method of claim 1, wherein caching the predicted one or more resources includes making the one or more cached resources immediately available upon a user's demand for the one or more cached resources.

7. A computer system for pre-caching resources within a cloud system, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
collecting audit records, wherein the audit records follow a data standard and used to identify, in real-time, demands of the cloud system, and wherein each of the audit records has an embedded timestamp;
determining the collected audit records follow the data standard, wherein determining the collected audit records follow the data standard further comprises:
parsing a generated audit record;
retrieving data standard compliant information from the parsed generated audit records; and
recompiling the parsed generated audit record in data standard compliant format;
determining one or more workflow patterns and resource utilizations based on the collected audit records, wherein the one or more workflow patterns and resource utilizations comprise a request, a request identification number, and the embedded timestamp;
determining a sequence of events during a timeframe based on analyzing the collected audit records, wherein the sequence of events has a numerical ranking that represents a number of times the sequence of events occurred in the collected audit records;
predicting one or more resources based on the determined one or more workflow patterns and resource utilizations, the sequence of events during the timeframe and the numerical ranking; and
caching, in the real-time, the predicted one or more resources to make the predicted one or more resources available at a time of a predicted request.

8. The computer system of claim 7, wherein collecting the audit records further comprises:
turning on auditing capabilities on an application of the cloud system; and
storing each of the audit records generated by the application of the cloud system in a text file.

9. The computer system of claim 8, wherein the audit records generated by the application of the cloud system are stored in an audit database maintained by the cloud system.

10. The computer system of claim 7, wherein determining the one or more workflow patterns and resource utilizations further comprises chronologically merging the audit records generated by an application of the cloud system based on the embedded timestamp and the request identification number.

11. The computer system of claim 7, wherein predicting the one or more resources based on the determined one or more workflow patterns and resource utilizations, the sequence of events during the timeframe and the numerical ranking further comprises upscaling or downscaling the resources based on the determined one or more workflow patterns and resource utilizations.

12. The computer system of claim 7, wherein caching the predicted one or more resources includes making the one or more cached resources immediately available upon a user's demand for the one or more cached resources.

13. A computer program product for pre-caching resources within a cloud system, comprising:
one or more non-transitory computer-readable storage media and program instructions stored on at least one of the one or more tangible storage media, the program instructions executable by a processor to cause the processor to perform a method comprising:
collecting audit records, wherein the audit records follow a data standard and used to identify, in real-time, demands of the cloud system, and wherein each of the audit records has an embedded timestamp;
determining the collected audit records follow the data standard, wherein determining the collected audit records follow the data standard further comprises:
parsing a generated audit record;
retrieving data standard compliant information from the parsed generated audit records; and
recompiling the parsed generated audit record in data standard compliant format;
determining one or more workflow patterns and resource utilizations based on the collected audit records, wherein the one or more workflow patterns and resource utilizations comprise a request, a request identification number, and the embedded timestamp;

determining a sequence of events during a timeframe based on analyzing the collected audit records, wherein the sequence of events has a numerical ranking that represents a number of times the sequence of events occurred in the collected audit records;

predicting one or more resources based on the determined one or more workflow patterns and resource utilizations, the sequence of events during the timeframe and the numerical ranking; and caching, in the real-time, the predicted one or more resources to make the predicted one or more resources available at a time of a predicted request.

14. The computer program product of claim 13, wherein collecting the audit records further comprises:

turning on auditing capabilities on an application of the cloud system; and storing each of the audit records generated by the application of the cloud system in a text file.

15. The computer program product of claim 14, wherein the audit records generated by the application of the cloud system are stored in an audit database maintained by the cloud system.

16. The computer program product of claim 13, wherein determining the one or more workflow patterns and resource utilizations based on the collected audit records further comprises chronologically merging the audit records generated by an application of the cloud system based on the embedded timestamp and the request identification number.

17. The computer program product of claim 13, wherein predicting the one or more resources based on the determined one or more workflow patterns and resource utilizations, the sequence of events during the timeframe and the numerical ranking further comprises upscaling or downscaling the resources based on the determined one or more workflow patterns and resource utilizations.

* * * * *